US012656466B2

(12) United States Patent
Freeman et al.

(10) Patent No.: US 12,656,466 B2
(45) Date of Patent: Jun. 16, 2026

(54) TIME-OF-FLIGHT DISTANCE COMPENSATION THRESHOLD RAMP DRIVER

(71) Applicant: Sensors Unlimited, Inc., Princeton, NJ (US)

(72) Inventors: Christopher Freeman, Ringoes, NJ (US); Michael W. Delamere, Pennington, NJ (US); John Liobe, Newton, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 1099 days.

(21) Appl. No.: 17/720,632

(22) Filed: Apr. 14, 2022

(65) Prior Publication Data

US 2023/0333221 A1      Oct. 19, 2023

(51) Int. Cl.
| | |
|---|---|
| *G01S 7/48* | (2006.01) |
| *G01S 7/486* | (2020.01) |
| *G01S 7/4865* | (2020.01) |
| *G01S 17/14* | (2020.01) |

(52) U.S. Cl.
CPC .......... *G01S 7/4868* (2013.01); *G01S 7/4865* (2013.01); *G01S 17/14* (2020.01)

(58) Field of Classification Search
USPC ....................................................... 356/4.01
See application file for complete search history.

(56) References Cited

U.S. PATENT DOCUMENTS

| | | | | |
|---|---|---|---|---|
| 10,520,589 | B2 | 12/2019 | Liobe et al. | |
| 10,801,886 | B2 | 10/2020 | Mandai et al. | |
| 11,310,452 | B2 * | 4/2022 | Uesugi | H10F 39/802 |
| 11,474,216 | B2 * | 10/2022 | Kimball | G01S 7/4863 |
| 11,774,561 | B2 * | 10/2023 | Gaalema | H03F 1/56 330/7 |
| 2013/0076948 | A1 * | 3/2013 | Tanaka | H04N 25/70 348/302 |
| 2015/0362586 | A1 * | 12/2015 | Heinrich | G01S 7/497 356/5.01 |
| 2018/0209846 | A1 * | 7/2018 | Mandai | G01S 17/08 |
| 2019/0113605 | A1 * | 4/2019 | Liobe | H04N 25/77 |
| 2019/0113623 | A1 * | 4/2019 | Liobe | G01S 7/4863 |

(Continued)

FOREIGN PATENT DOCUMENTS

CN              113534107 A      10/2021

*Primary Examiner* — James R Hulka

(74) *Attorney, Agent, or Firm* — Schwegman Lundberg & Woessner, P.A.

(57) ABSTRACT

A time-of-flight sensor threshold circuit outputs a threshold voltage to a time-of-flight sensor, the threshold reducing over the duration of a time-of-flight measurement, which reduction can occur continually during the measurement. The circuit is provided with an initial threshold voltage portion to set the threshold voltage corresponding to a selected maximum threshold value, a time-dependent portion, to charge and discharge over time, to or from a current control portion, a threshold voltage ramp control portion to lower the threshold value over time by charging or discharging the time-dependent portion to or from the current control portion at a selected rate, and a synchronizing portion to synchronize current flow to or from the current control portion with a synchronizing input signal synchronized with an illumination pulse from a connected illuminator.

22 Claims, 6 Drawing Sheets

(56)           References Cited

U.S. PATENT DOCUMENTS

| | | | |
|---|---|---|---|
| 2020/0256961 A1 | 8/2020 | Gaalema et al. | |
| 2021/0088634 A1 | 3/2021 | Kimball et al. | |
| 2021/0255288 A1* | 8/2021 | Liobe | G01S 7/4873 |
| 2021/0344347 A1* | 11/2021 | Kato | G01S 17/894 |
| 2022/0079447 A1* | 3/2022 | Malchow | G06T 7/73 |
| 2022/0291359 A1* | 9/2022 | Tziony | G01S 7/4865 |
| 2022/0345652 A1* | 10/2022 | Hamamatsu | G01C 3/06 |
| 2023/0061653 A1* | 3/2023 | Zhu | G01S 7/484 |

* cited by examiner

With Fixed Threshold Setting Per Laser Pulse

Detector Intensity Threshold Setting

Normalized Laser Energy

Target Distance

Detectable range for a
given threshold setting.

400

TIME-OF-FLIGHT DISTANCE COMPENSATION THRESHOLD RAMP DRIVER

RESEARCH OR DEVELOPMENT

This invention was made with government support. The government has certain rights in the invention.

BACKGROUND OF THE INVENTION

Laser range finding systems are used for determining the distance of objects of interest or targets, and tracking such objects that are illuminated by a laser source in a field-of-view of an image sensor, typically as defined by system optics. Among such systems are so-called time-of-flight systems that calculate distance based on the time needed for an emitted light pulse from the system to return back to the system. Time-of-flight camera systems include an illumination unit (typically a laser light source), image sensor or focal plane array, various optical elements, as needed, and supporting electronics and software necessary to operate such systems. Optical elements normally include filters used to filter out wavelengths of light that are outside the range of the illumination provided by the system itself. Often short-wave infrared (SWIR), having wavelengths in the range of about 1 to 3 micron, is used.

Although generally considered satisfactory for their intended purpose, the nature of reflected light is such that the intensity of the reflected light decreases as distance from a target increases, and also in relationship to the reflectance of a target.

If a time-of-flight reading is done with a fixed threshold, and the threshold is too high, a return pulse will not be detected. The threshold setting will repeatedly need to be lowered and more readings will need to be taken in order to achieve the correct threshold setting for a given target.

FIG. 1 shows a normalized reflected laser light value versus distance graph with high threshold setting in accordance with the prior art, the high threshold only being suitable for objects or targets at relatively close distances.

FIG. 2 shows a normalized reflected laser light value versus distance graph with low threshold setting in accordance with the prior art, which allows for target detection at an increased distance, but which increases the possibility for extraneous light noise to be detected by the sensor, rendering a distance measurement inaccurate.

Accordingly, Applicant recognizes that time-of-flight detectors can benefit from variable threshold settings to allow for a range of target distances and corresponding intensities of reflected light. Software control for threshold adjustment is too slow to effectively adjust threshold values in the timeframes in question—particularly within the typical required timeframe of microseconds. Moreover, software cannot modulate a threshold setting during an actual time-of-flight measurement. Applicant recognizes the need, therefore, for fast and reliable adjustment of threshold values to improve speed and accuracy of time-of-flight readings. The devices, systems and related methods of the present disclosure provide solutions for this need.

SUMMARY OF THE INVENTION

In accordance with the present invention, devices, systems and methods are provided that benefit from a threshold setting that will lower itself during a time-of-flight reading so that a broader range of distances can be observed in one reading, minimizing measurement time, while maintaining accuracy to the extent possible. In accordance with one preferred aspect, the threshold setting is lowered continuously during the reading. Depending on the embodiment, this lowering of a threshold can correspond to a decreasing voltage, or alternatively, if respective circuits are so configured, to an increasing voltage.

In accordance with one aspect of the invention, a time-of-flight sensor threshold circuit is provided, which is adapted and configured to output a threshold voltage to a photosensitive sensor, which can be a focal plane array, for example. The sensor threshold circuit can be provided as an external circuit connected to, or alternatively as an integrated subcircuit of the sensor. The threshold circuit or subcircuit, depending on how embodied, includes an output portion in electrical communication with the sensor, adapted and configured to output a threshold voltage to the sensor, an initial threshold voltage portion, which includes at least one solid-state circuit element adapted and configured to set the threshold voltage at a selected maximum threshold value. The maximum threshold value typically corresponds to a maximum threshold voltage, although implementations consisting of an inversely proportional voltage-to-threshold relationship are conceived, which have a maximum threshold value that corresponds to a minimum threshold voltage. The sensor threshold circuit further includes a time-dependent portion, including at least one solid-state circuit element adapted and configured to charge and discharge over time, in electrical communication with the output portion.

In accordance with one aspect, a current control portion is provided as a current sink, including at least one solid-state circuit element adapted and configured to dissipate electrical energy to a circuit ground. Also provided are a threshold voltage ramp control portion, including at least one solid-state circuit element adapted and configured to lower the threshold value over time by discharging the time-dependent portion to the current control portion at a selected rate, and a synchronizing portion, including at least one solid-state circuit element adapted and configured to synchronize current flow to the current control portion with a synchronizing input signal. In accordance with this aspect, the time-of-flight sensor threshold circuit is adapted and configured such that the output portion outputs a resultant time-dependent threshold voltage to the sensor, the threshold value reducing over time from a maximum initial threshold value, while a synchronizing input signal is provided.

In accordance with another aspect, alternatively a current control portion is provided as a current source in place of a current sink, including at least one solid-state circuit element adapted and configured to source electrical energy from a regulated voltage source. Also provided are a threshold voltage ramp control portion, including at least one solid-state circuit element adapted and configured to lower the threshold value over time by charging the time-dependent portion from the current control portion at a selected rate, and a synchronizing portion, including at least one solid-state circuit element adapted and configured to synchronize current flow from the current source portion with a synchronizing input signal. In accordance with this aspect, the time-of-flight sensor threshold circuit is adapted and configured such that the output portion outputs a resultant time-dependent threshold voltage to the sensor, the threshold value reducing over time from a maximum initial threshold value, while a synchronizing input signal is provided.

The time-of-flight sensor threshold circuit can further include one or more digital-to-analog converters adapted and configured to receive an input from a programming circuit of a control system and output an initial threshold voltage and a ramp rate control voltage.

Devices and systems in accordance with the invention can further include a synchronizing interface circuit adapted and configured to provide the input signal to the synchronizing portion, in time with an illumination pulse. Moreover devices and systems can include a relay, adapted and configured to enable or disable the time-of-flight sensor threshold circuit from the time-of-flight sensor in response to a control signal from an interface circuit.

In accordance with a preferred aspect of the invention, the threshold value can be configured to decrease either linearly or exponentially over time from the initial threshold value. Depending on the precise implementation, this decrease in threshold value can correspond to either a decrease or increase in threshold voltage, which likewise can be substantially linear or exponential, for example. In accordance with the invention, the time-dependent portion can include one or more capacitors or alternative time-dependent circuit elements.

In accordance with the invention, adjustable threshold voltage ramp control can be provided, as illustrated and described in further detail below, or alternatively, the ramp rate can be pre-set at the time of manufacture with non-adjustable circuit elements, such as resistors with set values, for example.

In accordance with a further aspect of the present invention, a method of adjusting a threshold value of a time-of-flight sensor during a time-of-flight distance reading is provided, which method includes providing a time-dependent circuit element, setting a maximum threshold value of the time-dependent circuit element, setting a ramp rate to lower the threshold value over time by discharging or charging the time-dependent circuit element with a current control circuit at a selected rate, and synchronizing current flow to or from the time-dependent circuit element from or to the current control circuit with a laser pulse, reducing the threshold value during the laser pulse from a maximum threshold value. Reduction of the threshold value, in accordance with a preferred embodiment, occurs continually during the laser pulse.

In accordance with this embodiment, the current control circuit can be a current sink or a voltage source, depending on the precise implementation, the time dependent circuit can include at least one capacitor, and the threshold value can be continually adjusted during a time-of-flight reading.

In accordance with still a further aspect of the invention, a time-of-flight sensor system is provided, which includes an illuminator adapted and configured to flash a scene with an illumination pulse, a sensor that is sensitive to the illumination pulse, the sensor being adapted to receive a threshold voltage signal, and a controller operatively connected to the illuminator and the sensor, the controller being configured to continuously lower a sensor threshold value during the illumination pulse.

In accordance with this aspect, the controller can include a threshold circuit, adapted and configured to output a threshold voltage to the sensor, the threshold circuit including an output portion in electrical communication with the sensor, or alternatively the threshold circuit can be a sub-circuit of the sensor, and adapted and configured to output a threshold voltage to the sensor, an initial threshold voltage portion, including at least one solid-state circuit element adapted and configured to set the threshold voltage at a selected maximum threshold value, a time-dependent portion, including at least one solid-state circuit element adapted and configured to charge and discharge over time, in electrical communication with the output portion, a current control portion, including at least one solid-state circuit element adapted and configured to dissipate or provide electrical energy, a threshold voltage ramp control portion, including at least one solid-state circuit element adapted and configured to lower the threshold value over time by charging or discharging the time-dependent portion with the current control portion at a selected rate, and a synchronizing portion, including at least one solid-state circuit element adapted and configured to synchronize current flow to or from the current control portion with a synchronizing input signal, synchronized with the illumination pulse, the output portion outputting a resultant time-dependent threshold voltage to the sensor, the threshold value reducing over time from the maximum threshold value, while a synchronizing input signal is provided.

BRIEF DESCRIPTION OF THE DRAWINGS

So that those skilled in the art to which the subject disclosure appertains will readily understand how to make and use the devices, systems and methods of the subject disclosure without undue experimentation, embodiments thereof will be described in detail below with reference to certain figures, wherein.

DETAILED DESCRIPTION OF THE INVENTION

Figure 1:
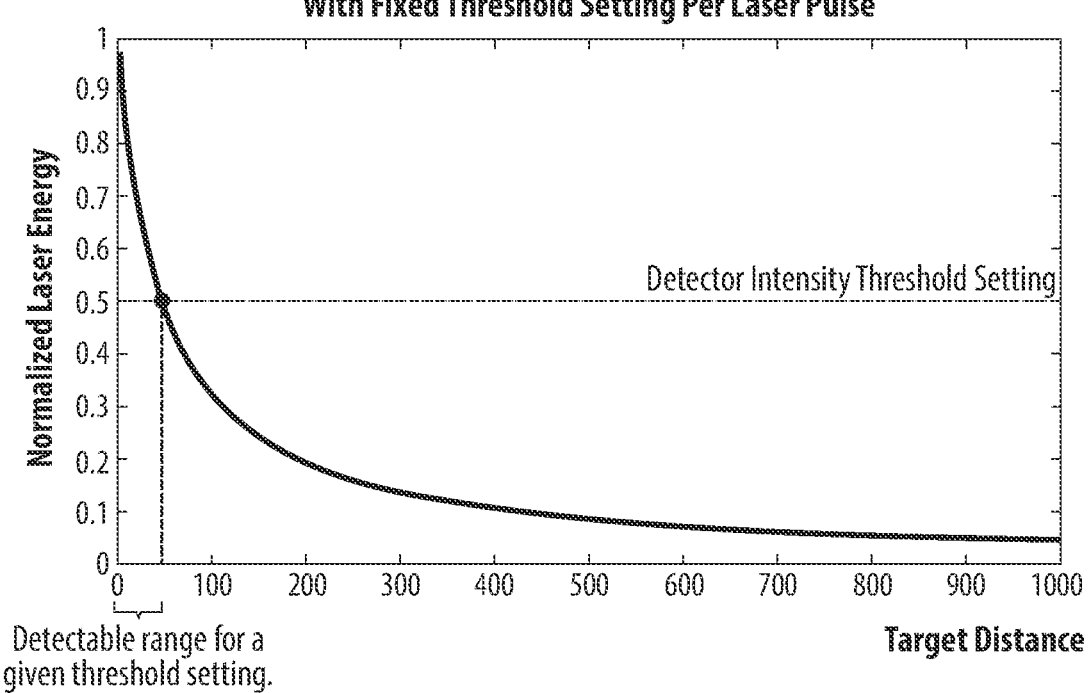
FIG. 1 is a normalized reflected laser light versus distance graph with high threshold setting in accordance with the prior art.
Figure 2:
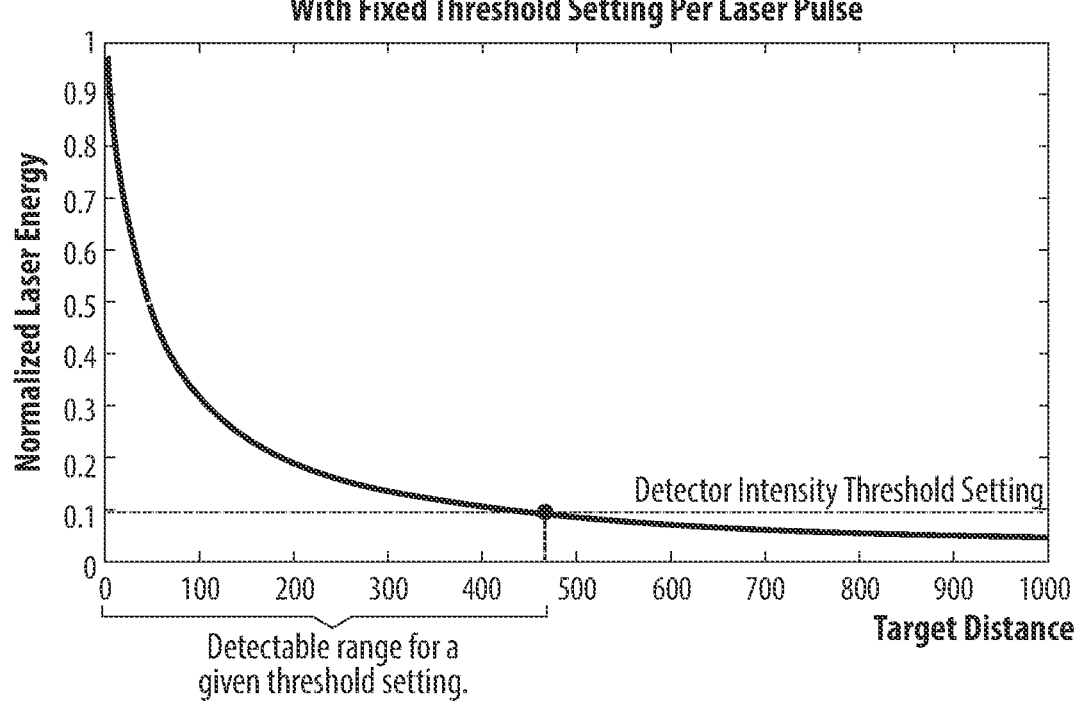
FIG. 2 is a normalized reflected laser light versus distance graph with low threshold setting in accordance with the prior art.

Reference will now be made to the drawings wherein like reference numerals identify similar structural features or aspects of the subject disclosure.

Figure 3:
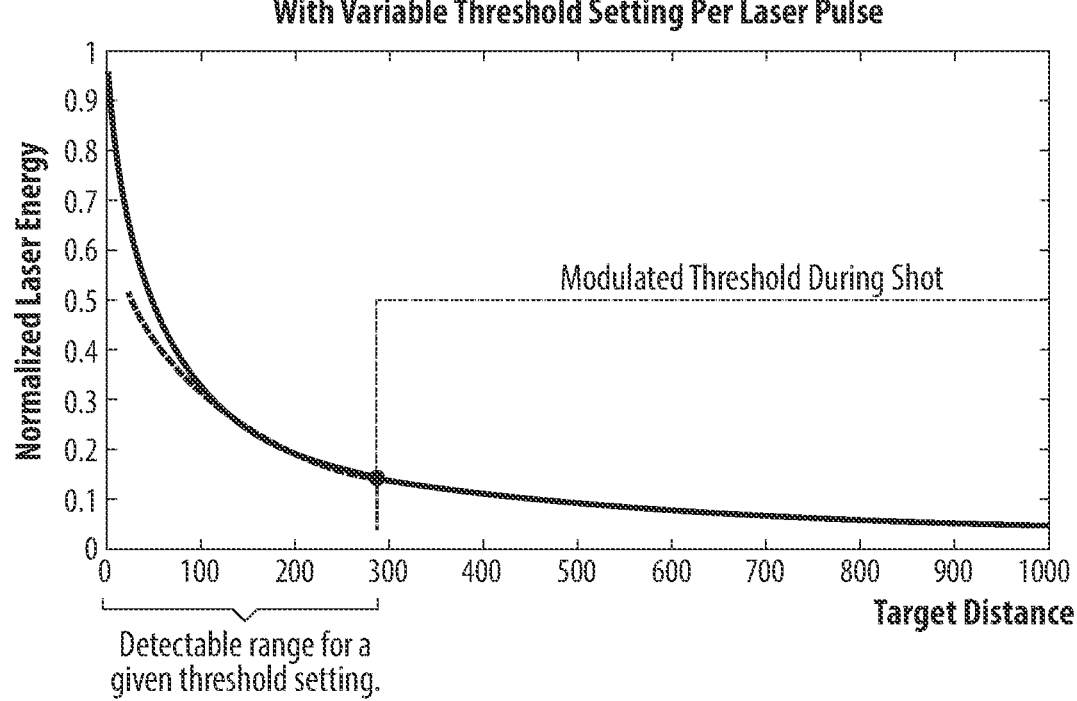
FIG. 3 is a normalized reflected laser light versus distance graph with modulated threshold setting in accordance with the present invention.

As illustrated in FIG. 3, and in accordance with one aspect of the present invention, devices, systems and methods are provided that benefit from a threshold setting that will lower itself during a time-of-flight reading so that a broader range of distances can be observed in one reading, minimizing measurement time, while maintaining accuracy to the extent possible. In accordance with one preferred aspect, the threshold setting is lowered continuously during the reading.

Figure 4:
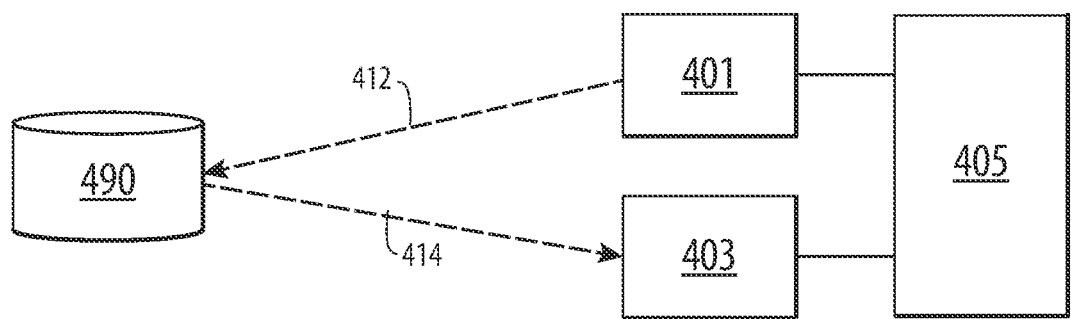
FIG. 4 is a schematic view of a time-of-flight system in accordance with the present invention.

For purposes of explanation and illustration, and not limitation, a schematic diagram of an exemplary embodiment of an example time-of-flight camera system in accordance with the present invention is shown in FIG. 4 and is designated generally by reference character 400. The system 400 includes an illuminator 401 and sensor 403 operably connected to a controller 405. The illuminator 401 emits a pulse of light, as indicated by line 412, which is reflected by an object 490 and returned to the sensor 403, as indicated by line 414. In accordance with the present invention, within the controller 405 are various electronic components, including provisions for adjusting sensor threshold values during a time-of-flight measurement, such as, for example, the threshold voltage ramp driver circuit 500 illustrated in FIG. 5. Alternatively, if desired, sensor threshold adjustment provisions can be integrated with the sensor 403 itself, or in another component of the system 400. It will be apparent to those skilled in the art that variations of the precise implementation of circuity to enable adjustment of sensor threshold values during a time-of-flight measurement can be made without departing from the spirit or scope of the invention.

Figure 5:
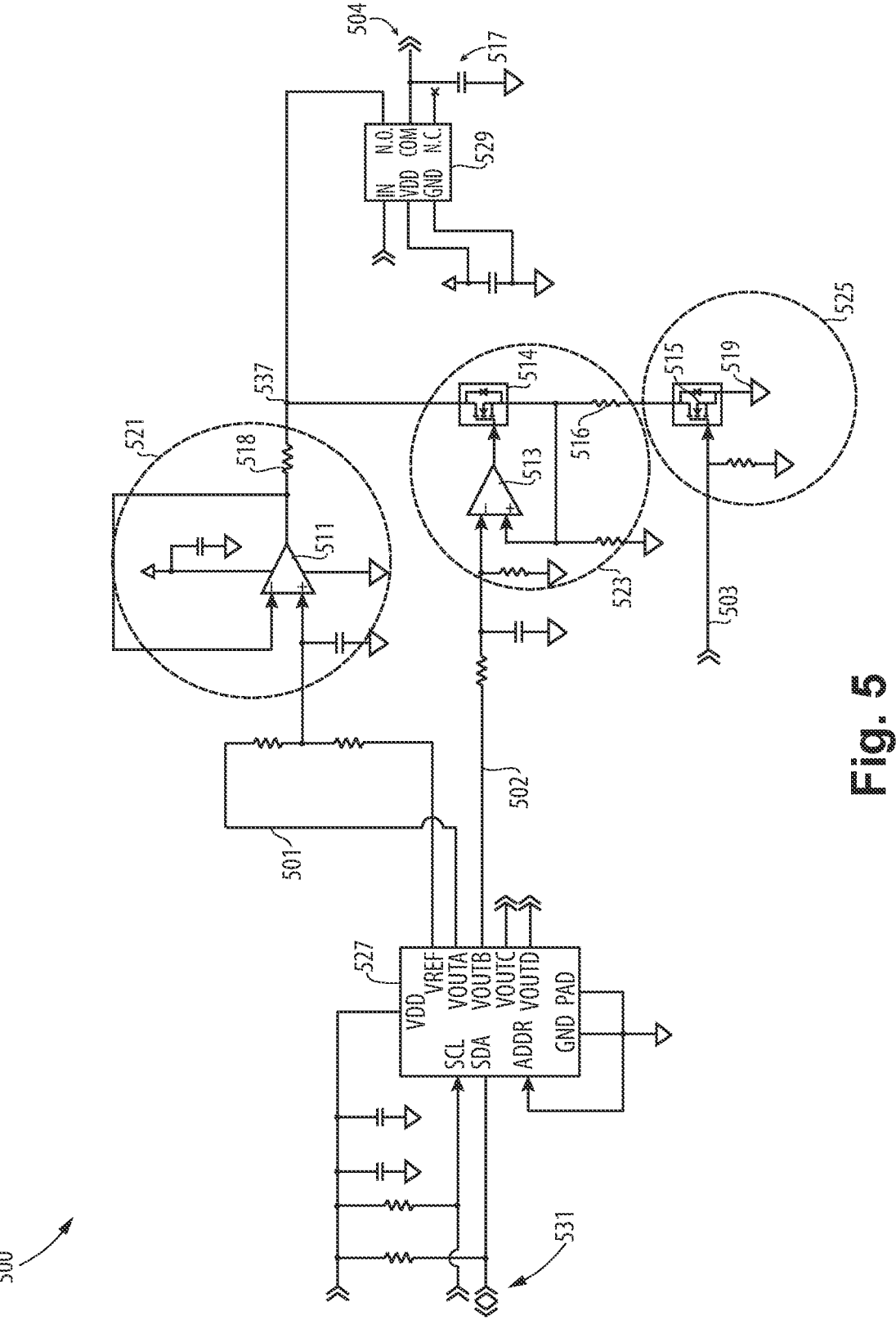
FIG. 5 is a schematic of a threshold voltage ramp driver circuit in accordance with the present invention.

With reference now to FIG. 5, an example threshold voltage ramp driver circuit is illustrated in accordance with a preferred aspect of the present invention. The circuit 500 is adapted and configured to output a threshold voltage to photosensitive sensor, such as a focal plane array, which is itself not explicitly illustrated in FIG. 5, but which is part of the sensor 403 of FIG. 4. An output portion 504 is in electrical communication with the sensor 403, and is adapted and configured to output a threshold voltage to the sensor 403. An initial threshold voltage portion 521 is provided and includes an op-amp 511 configured as a voltage buffer to supply a constant initial voltage to node 537 via resistor 518 in response to a control input 501. If optional enable/disable relay 529 is provided, in use, the circuit is enabled by way of a control signal to the relay 529, allowing a time-dependent circuit component 517 to stabilize—in this case, a capacitor, which is charged to the initial threshold voltage. Absent the optional relay 529, the time-dependent circuit component 517 will begin to stabilize to the initial/maximum threshold voltage in response to input 501, not requiring any further input.

In the illustrated embodiment, a digital-to-analog converter 527 can be provided to receive instructions via digital control inputs 531 from a higher level control system, which is part of the controller 405 system 400. The digital-to-analog converter 527 then outputs an initial threshold voltage value 501 and a threshold voltage slope control value 502, which will be described in more detail below.

A threshold voltage ramp control portion 523 receives the threshold voltage slope (or "ramp") control value 502 and includes circuit components that are adapted and configured to substantially linearly vary current from the node 537 with a current control portion, which in the illustrated embodiment is a current drain. In this embodiment the current drain includes at least a ground connection 519 and a resistor 516. In alternative embodiments, the current control portion can be a regulated voltage source, thereby varying current to node 537. Also, although the current embodiment is configured to substantially linearly control current flow from the node 537, alternate embodiments can be configured such that the current is varied in another predictable manner.

The threshold voltage ramp control portion 523 in the illustrated embodiment includes a transistor 514 and an op-amp 513 with feedback so as to allow a substantially linear response in limiting of current flow from (or to) node 537 in response to the input slope control value 502. The transistor 514 can be selected from any suitable components so as to provide the desired response characteristics, such as an N-channel MOSFET, for example. In alternate embodiments, if desired, the aforementioned variable voltage ramp control portion 523 can be replaced with a nonvariable circuit components, effectively setting a ramp rate at the time of manufacture, while still achieving many of the objectives of the present invention.

The circuit 500 further includes a synchronizing portion 525, including at least one solid-state circuit element such as a transistor 515, which is adapted and configured to synchronize current flow to, or in alternative embodiments from, the current control portion with a synchronizing input signal 503. In a preferred aspect, the synchronizing input signal 503 is synchronized with a LASER pulse emitted by the illumination unit 401, through the circuitry of the controller 405. The transistor 515 can be selected from any suitable components so as to provide the desired response characteristics, such as an N-channel MOSFET, for example.

Figure 6:
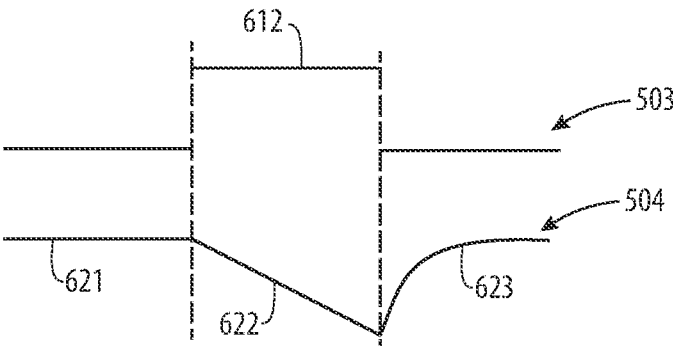
FIG. 6 is a plot of relative threshold voltage over time: before, during and after a synchronizing pulse is received.

In response to the input signals 501, 502 and finally 503, the output 504 outputs a resultant time-dependent threshold voltage to the sensor 403 of system 400. As illustrated in FIG. 6, the output threshold voltage 504 reduces over time at section 622 from an initial threshold voltage 621, while a synchronizing input signal 612 is provided. Once the synchronizing input signal 612 is removed, the output threshold voltage 504 quickly increases at section 623 as the time-dependent circuit element(s) restabilize, as transistor 515 is thus shut off and current flow to drain is stopped. Varying of initial threshold voltage values or the ramp rate can be selected by varying the value of input 501 or 502, respectively. In alternate embodiments, the voltage increases over time, as discussed elsewhere herein.

Accordingly, as a time-of-flight reading is being taken, the threshold is reduced, thereby increasing sensitivity in order to compensate for the loss of intensity of the returned light pulse due to greater distances from a target and/or low target reflectivity. Depending on the precise implementation, the reduction of threshold can be reduced in a substantially linear fashion. Alternatively, the reduction of threshold can be reduced in an exponential fashion, if desired.

While the devices, systems and methods of the subject disclosure have been shown and described with reference to embodiments, those skilled in the art will readily appreciate that changes and/or modifications may be made thereto without departing from the spirit and scope of the subject disclosure.

What is claimed is:

1. A time-of-flight sensor threshold circuit comprising:
   an output portion in electrical communication with a time-of-flight sensor, adapted and configured to output a threshold voltage to the sensor;
   an initial threshold voltage portion, including at least one solid-state circuit element adapted and configured to set the threshold voltage at a selected maximum threshold value;
   a time-dependent portion, including at least one solid-state circuit element adapted and configured to charge and discharge over time, in electrical communication with the output portion;
   a current control portion, including at least one solid-state circuit element adapted and configured to dissipate or provide electrical energy;
   a threshold voltage ramp control portion, including at least one solid-state circuit element adapted and configured to lower the threshold value over time by discharging or charging the time-dependent portion to the current control portion at a selected rate; and
   a synchronizing portion, including at least one solid-state circuit element adapted and configured to synchronize current flow to or from the current control portion with a synchronizing input signal derived from or time-aligned with an external illumination event, enabling the threshold voltage ramp control portion in response to that external illumination event, the output portion outputting a resultant time-dependent threshold voltage to the sensor, the threshold value reducing over time from the initial threshold value, while a synchronizing input signal is provided.

2. The time-of-flight sensor threshold circuit of claim 1, wherein the circuit is adapted and configured to output a threshold voltage to a separate sensor.

3. The time-of-flight sensor threshold circuit of claim 1, wherein the circuit is an integrated part of the sensor.

4. The time-of-flight sensor threshold circuit of claim 1, further comprising a digital-to-analog converter adapted and configured to receive an input from a programming circuit of a control system and output:

an initial threshold voltage; and a ramp rate control voltage.

5. The time-of-flight sensor threshold circuit of claim 1, further comprising a synchronizing interface circuit adapted and configured to provide the input signal to the synchronizing portion, in time with the external illumination event.

6. The time-of-flight sensor threshold circuit of claim 1, further comprising a relay, adapted and configured to enable or disable the time-of-flight sensor threshold circuit from the time-of-flight sensor in response to a control signal from an interface circuit.

7. The time-of-flight sensor threshold circuit of claim 1, wherein the threshold voltage declines over time from the initial threshold voltage.

8. The time-of-flight sensor threshold circuit of claim 7, wherein the threshold voltage declines substantially linearly over time from the initial threshold voltage.

9. The time-of-flight sensor threshold circuit of claim 1, wherein the threshold voltage increases over time from the initial threshold voltage.

10. The time-of-flight sensor threshold circuit of claim 9, wherein the threshold voltage increases substantially linearly over time from the initial threshold voltage.

11. The time-of-flight sensor threshold circuit of claim 1, wherein the time-dependent portion comprises a capacitor.

12. The time-of-flight sensor threshold circuit of claim 1, wherein threshold voltage ramp control portion is adjustable.

13. The time-of-flight sensor threshold circuit of claim 1, wherein threshold voltage ramp control portion is fixed.

14. The time-of-flight sensor threshold circuit of claim 1, further comprising:

a time-of-flight sensor system including, an illuminator adapted and configured to flash a scene with an illumination pulse as the external illumination event;

a sensor that is sensitive to the illumination pulse, the sensor being adapted to receive a threshold voltage signal; and a controller operatively connected to the illuminator and the sensor, the controller being configured to continuously lower the sensor threshold value in response to and during the illumination pulse.

15. A method of adjusting a threshold value of a time-of-flight sensor during a time-of-flight distance reading, the method comprising:

providing a time-dependent circuit element;

setting a maximum threshold value of the time-dependent circuit element;

setting a ramp rate to lower the threshold value over time; and synchronizing current flow to or from the time-dependent circuit element from or to a current control circuit with an external illumination event to initiate lowering the threshold value, continually reducing the threshold value during the external illumination event from a maximum threshold value.

16. The method of claim 15, wherein the threshold value is lowered over time by charging the time-dependent circuit element from a current control circuit at a selected rate.

17. The method of claim 15, wherein the threshold value is lowered over time by discharging the time-dependent circuit element to a current control circuit at a selected rate.

18. The method of claim 15, wherein the time-dependent circuit element comprises a capacitor.

19. The method of claim 15, wherein the threshold value is continually adjusted during a time-of-flight distance reading.

20. The method of claim 15, further comprising:

flashing a scene with an illumination pulse as the external illumination event;

sensing the external illumination pulse responsive to a received threshold voltage signal; and continuously lowering the threshold value in response to the illumination pulse.

21. A time-of-flight sensor system comprising:

an illuminator adapted and configured to flash a scene with an illumination pulse;

a sensor that is sensitive to the illumination pulse, the sensor being adapted to receive a threshold voltage signal; and a controller operatively connected to the illuminator and the sensor, the controller being configured to continuously lower a sensor threshold value in response to the illumination pulse.

22. The time-of-flight sensor system of claim 21, wherein the controller includes a threshold circuit, adapted and configured to output a threshold voltage to the sensor, the threshold circuit comprising:

an output portion in electrical communication with the sensor, adapted and configured to output a threshold voltage of the threshold circuit to the sensor;

an initial threshold voltage portion, including at least one solid-state circuit element adapted and configured to set the threshold voltage at a selected maximum threshold value;

a time-dependent portion, including at least one solid-state circuit element adapted and configured to charge and discharge over time, in electrical communication with the output portion;

a current control portion, including at least one solid-state circuit element adapted and configured to dissipate or provide electrical energy;

a threshold voltage ramp control portion, including at least one solid-state circuit element adapted and configured to lower the sensor threshold value over time by charging or discharging the time-dependent portion from or to the current control portion at a selected rate; and a synchronizing portion, including at least one solid-state circuit element adapted and configured to synchronize current flow to or from the current control portion with a synchronizing input signal, synchronized with the illumination pulse, to enable the threshold voltage ramp control portion, the output portion outputting a resultant time-dependent threshold voltage to the sensor, the sensor threshold value reducing over time from the maximum threshold value, while a synchronizing input signal is provided.

* * * * *